(12) United States Patent
Brochu et al.

(10) Patent No.: US 11,240,652 B2
(45) Date of Patent: *Feb. 1, 2022

(54) CONTROLLER AND METHOD, DEVICE AND SYSTEM FOR USE IN CONFIGURING SAME

(71) Applicant: GECKO ALLIANCE GROUP INC., Quebec (CA)

(72) Inventors: Christian Brochu, Quebec (CA); Benoit Laflamme, Quebec (CA)

(73) Assignee: GECKO ALLIANCE GROUP INC., Quebec (CA)

( * ) Notice: Subject to any disclaimer, the term of this patent is extended or adjusted under 35 U.S.C. 154(b) by 74 days.

This patent is subject to a terminal disclaimer.

(21) Appl. No.: 16/556,724

(22) Filed: Aug. 30, 2019

(65) Prior Publication Data
US 2020/0015054 A1    Jan. 9, 2020

Related U.S. Application Data

(63) Continuation of application No. 15/464,023, filed on Mar. 20, 2017, now Pat. No. 10,433,135, which is a
(Continued)

(51) Int. Cl.
*G06F 8/65* (2018.01)
*H04W 4/80* (2018.01)
(Continued)

(52) U.S. Cl.
CPC .............. *H04W 4/80* (2018.02); *G06F 8/658* (2018.02); *G06F 21/35* (2013.01); *G06K 19/00* (2013.01); *H04W 4/50* (2018.02)

(58) Field of Classification Search
CPC ....................................................... G06F 9/65
See application file for complete search history.

(56) References Cited

U.S. PATENT DOCUMENTS

| 4,237,562 A | 12/1980 | DuPont |
| 5,457,826 A | 10/1995 | Haraga et al. |

(Continued)

FOREIGN PATENT DOCUMENTS

| CA | 2430862 | 11/2007 |
| CA | 2324598 | 5/2008 |

(Continued)

OTHER PUBLICATIONS

Notice of Allowance dated Aug. 28, 2020 in connection with U.S. Appl. No. 16/747,694—8 pages.
(Continued)

*Primary Examiner* — Duy Khuong T Nguyen

(57) ABSTRACT

A programmable controller for operating a system is provided as well as a method and devices of configuring such controller. The controller includes firmware storing instructions for controlling operations of the system, the firmware including a passive memory component and a processing unit programmed for operating the system at least in part based on the instructions of the firmware. The firmware is responsive to a signal carrying firmware update information received from an external device for drawing energy from the signal to activate the passive memory component and causing a firmware update process to be performed. Advantageously, the proposed controller can be configured in the absence of electrical power being supplied by an external source and in, some embodiments, using the signal carrying the firmware update information as the sole source of electrical energy in order to perform at least part of the firmware update process.

20 Claims, 5 Drawing Sheets

Related U.S. Application Data continuation of application No. 14/286,788, filed on May 23, 2014, now Pat. No. 9,641,959.

(51) Int. Cl.
    *G06F 21/35*    (2013.01)
    *H04W 4/50*    (2018.01)
    *G06F 8/658*    (2018.01)
    *G06K 19/00*    (2006.01)

(56) References Cited

U.S. PATENT DOCUMENTS

| | | |
|---|---|---|
| 5,710,409 A | 1/1998 | Schwarzbacker et al. |
| 5,772,963 A | 6/1998 | Cantatore et al. |
| 5,930,852 A | 8/1999 | Gravat et al. |
| 5,988,857 A | 11/1999 | Ozawa et al. |
| 6,200,108 B1 | 3/2001 | Caudill et al. |
| 6,282,370 B1 | 8/2001 | Cline et al. |
| 6,355,913 B1 | 3/2002 | Authier et al. |
| 6,444,171 B1 | 9/2002 | Sakazume et al. |
| 6,476,363 B1 | 11/2002 | Authier et al. |
| 6,487,717 B1 | 11/2002 | Brunemann et al. |
| 6,488,408 B1 | 12/2002 | Laflamme et al. |
| 6,717,050 B2 | 4/2004 | Laflamme et al. |
| 6,744,223 B2 | 6/2004 | Laflamme et al. |
| 6,780,617 B2 | 8/2004 | Chen |
| 6,782,309 B2 | 8/2004 | Laflamme et al. |
| 6,813,575 B2 | 11/2004 | Laflamme |
| 6,874,175 B2 | 4/2005 | Laflamme et al. |
| 6,900,736 B2 | 5/2005 | Crumb |
| 6,929,516 B2 | 8/2005 | Brochu et al. |
| 6,942,354 B2 | 9/2005 | Metayer et al. |
| 6,976,052 B2 | 12/2005 | Tompkins et al. |
| 7,112,768 B2 | 9/2006 | Brochu et al. |
| 7,327,275 B2 | 2/2008 | Brochu et al. |
| 7,419,406 B2 | 9/2008 | Brochu et al. |
| 7,440,829 B2 | 10/2008 | Hara |
| 7,489,986 B1 | 2/2009 | Laflamme et al. |
| 7,593,789 B2 | 9/2009 | Gougerot et al. |
| 7,619,181 B2 | 11/2009 | Authier |
| 7,664,845 B2 | 2/2010 | Kurtz et al. |
| 7,701,679 B2 | 4/2010 | Brochu et al. |
| 7,788,669 B2 | 8/2010 | England et al. |
| 7,843,357 B2 | 11/2010 | Brochu et al. |
| 7,982,625 B2 | 7/2011 | Brochu et al. |
| 8,104,110 B2 | 1/2012 | Caudill et al. |
| 8,150,552 B2 | 4/2012 | Brochu et al. |
| 8,164,470 B2 | 4/2012 | Brochu et al. |
| 9,078,802 B2 | 7/2015 | Brochu et al. |
| D743,586 S | 11/2015 | Bosua |
| 9,326,359 B2 | 4/2016 | Bosua |
| 9,385,784 B2 | 7/2016 | Kim |
| 9,445,482 B2 | 9/2016 | Brochu et al. |
| 9,565,744 B2 | 2/2017 | Lai et al. |
| 9,609,725 B2 | 3/2017 | Bosua et al. |
| 9,641,959 B2 | 5/2017 | Brochu et al. |
| 9,713,235 B2 | 7/2017 | Brochu et al. |
| 9,854,651 B2 | 12/2017 | Lai et al. |
| D808,549 S | 1/2018 | Bosua |
| D808,550 S | 1/2018 | Alexander et al. |
| 9,883,563 B2 | 1/2018 | Bosua et al. |
| 10,085,330 B2 | 9/2018 | Brochu et al. |
| D862,747 S | 10/2019 | Alexander et al. |
| 10,433,135 B2 | 10/2019 | Brochu et al. |
| 10,582,595 B2 | 3/2020 | Brochu et al. |
| 10,772,171 B2 | 9/2020 | Bosua et al. |
| 10,779,384 B2 | 9/2020 | Alexander |
| 10,779,385 B2 | 9/2020 | Alexander et al. |
| 10,805,999 B2 | 10/2020 | Alexander |
| 10,887,955 B2 | 1/2021 | Brochu et al. |
| 2002/0035403 A1 | 3/2002 | Clark et al. |
| 2004/0204779 A1 | 10/2004 | Mueller et al. |
| 2004/0230794 A1 | 11/2004 | England et al. |
| 2005/0040250 A1 | 2/2005 | Wruck |
| 2005/0063123 A1 | 3/2005 | Cline et al. |
| 2005/0168902 A1 | 8/2005 | Laflamme et al. |
| 2005/0228544 A1 | 10/2005 | Bauer et al. |
| 2005/0240919 A1 | 10/2005 | Kim et al. |
| 2006/0178757 A1* | 8/2006 | Grgic ............... G05B 19/042 700/9 |
| 2006/0277330 A1 | 12/2006 | Diepstraten et al. |
| 2007/0106403 A1 | 5/2007 | Emery et al. |
| 2008/0003114 A1 | 1/2008 | Levin et al. |
| 2008/0086652 A1* | 4/2008 | Krieger ............... G06F 1/26 713/330 |
| 2009/0011417 A1 | 1/2009 | Maltezos et al. |
| 2009/0118871 A1 | 5/2009 | Debourke et al. |
| 2011/0046796 A1 | 2/2011 | Brochu et al. |
| 2011/0093099 A1 | 4/2011 | Tran et al. |
| 2012/0080944 A1 | 4/2012 | Recker et al. |
| 2012/0178367 A1 | 7/2012 | Matsumoto et al. |
| 2012/0224358 A1 | 9/2012 | Noble et al. |
| 2012/0329393 A1 | 12/2012 | Hillan et al. |
| 2013/0005247 A1 | 1/2013 | Awad et al. |
| 2013/0102247 A1 | 4/2013 | Hillan et al. |
| 2013/0293112 A1 | 11/2013 | Reed |
| 2014/0132210 A1 | 5/2014 | Partovi |
| 2014/0167978 A1 | 6/2014 | Popa |
| 2014/0213177 A1 | 7/2014 | Terwilliger |
| 2014/0265881 A1 | 9/2014 | Karc et al. |
| 2015/0061541 A1 | 3/2015 | Gandini |
| 2015/0188609 A1 | 7/2015 | Inoue et al. |
| 2015/0341969 A1 | 11/2015 | Brochu et al. |
| 2015/0342011 A1 | 11/2015 | Brochu et al. |
| 2016/0061396 A1 | 3/2016 | Bosua et al. |
| 2016/0165702 A1* | 6/2016 | Lai ............... H05B 45/10 315/201 |
| 2017/0163439 A1 | 6/2017 | Bosua et al. |
| 2018/0359841 A1 | 12/2018 | Brochu et al. |
| 2019/0059146 A1 | 2/2019 | Bosua et al. |
| 2019/0195433 A1 | 6/2019 | Bosua et al. |
| 2019/0208599 A1 | 7/2019 | Darton et al. |
| 2019/0380186 A1 | 12/2019 | Alexander et al. |
| 2020/0228954 A1 | 7/2020 | Bosua et al. |

FOREIGN PATENT DOCUMENTS

| | | |
|---|---|---|
| CA | 2442861 | 1/2009 |
| CA | 2521572 | 1/2009 |
| CA | 2483876 | 7/2009 |
| CA | 2349106 | 10/2009 |
| CA | 2361096 | 3/2011 |
| CA | 2467015 | 7/2011 |
| CA | 2492350 | 11/2011 |
| CA | 2412221 | 1/2012 |
| CA | 2499551 | 5/2012 |
| CA | 2357641 | 10/2012 |
| CA | 2678016 | 1/2014 |
| CA | 2852445 | 8/2018 |
| CA | 2892464 | 10/2018 |
| EM | 0022912030001 S | 8/2013 |
| EM | 0047082120001 S | 2/2018 |
| EP | 1588685 | 10/2005 |
| EP | 1653366 | 5/2006 |
| EP | 3146254 B1 | 4/2020 |
| WO | WO2006/133204 | 12/2006 |
| WO | WO2012/178107 | 12/2012 |
| WO | WO2013/049651 | 4/2013 |
| WO | WO2015/025267 | 2/2015 |

OTHER PUBLICATIONS

Hanabusa, Russel, "Comparing JTAG, SPI, and I2C ", Application Note, Spansion, Revision 01, issued on Apr. 13, 2007, 7 pages.

Office action dated Sep. 7, 2011, in connection with U.S. Appl. No. 12/528,256, 10 pages.

Examiner's Report dated Feb. 22, 2012, in connection with Canadian Patent Application 2,678,016, 3 pages.

Notice of Allowance dated Dec. 20, 2011, in connection with U.S. Appl. No. 12/528,256, 15 pages.

Examiner's Report dated Oct. 10, 2012 in connection with Canadian Patent Application Serial No. 2,678,016, 2 pages.

(56) References Cited

OTHER PUBLICATIONS

Office Action dated Oct. 22, 2014 in connection with U.S. Appl. No. 13/359,843, 20 pages.
Notice of Allowance dated Mar. 11, 2015 in connection with U.S. Appl. No. 13/359,843, 5 pages.
Office action dated Sep. 22, 2015 in connection with U.S. Appl. No. 14/286,788.
Examiner's Report dated Nov. 30, 2015 in connection with Canadian Patent Application No. 2,852,445.
Office action dated Dec. 3, 2015 in connection with U.S. Appl. No. 14/717,465.
Final Office Action dated Feb. 22, 2016 in connection with U.S. Appl. No. 14/286,788—78 pages.
Notice of Allowance dated May 25, 2016 in connection with U.S. Appl. No. 14/717,465.
Examiner's Report dated Jun. 7, 2016 in connection with Canadian Patent Application 2,892,464—5 pages.
Office Action dated Jul. 18, 2016 in connection with U.S. Appl. No. 14/286,788—81 pages.
Examiner's Report dated Dec. 9, 2016 in connection with Canadian Patent Application 2,892,464—4 pages.
Non-Final Action dated Dec. 23, 2016 in connection with U.S. Appl. No. 15/228,183—6pages.
Notice of Allowance dated Dec. 22, 2016 in connection with U.S. Appl. No. 14/286,788—3 pages.
International Preliminary Report on Patentability dated Aug. 26, 2009 in connection with International Patent Application Serial No. PCT/CA2008/000352, 7 pages.
International Search Report dated Jun. 6, 2008, in connection with International Patent Application PCT/CA2008/000352, 4 pages.
Written Opinion of the International Searching Authority dated Jun. 6, 2008, in connection with International Patenl Application PCT/CA2008/000352, 6 pages.
Extended European Search Report dated Nov. 28, 2011 in connection with European Patent Application No. 08 714 674.2, 7 pages.
"NFC Tag LSI," 29 pages of screenshots enclosed. Video uploaded on Feb. 19, 2013 by Panasonic. [Retrieved Oct. 19, 2018]. Video retrieved online via URL: https://channel.panasonic.com/contents/10774/.
"NFC Tag LSIs with Built-in FeRAM—embedded world 2013[Panasonic]," 11 pages of screenshots enclosed. Video uploaded on Mar. 15, 2013 by Panasonic. [Retrieved Oct. 19, 2018]. Video retrieved online via URL: https://channel.panasonic.com/contents/10869/.
Panasonic, "NFC Tag LSIs". Archived by Internet Archive Wayback Machine web.archive.org on Apr. 19, 2014, 3 pages. [Online] [Retrieved Oct. 19, 2018]. Retrieved online via URL: https://web.archive.org/web/20140419141948/http://www.semicon.panasonic.co.jp:80/en/products/logic/nfctags/.
"LG Laundry—NFC Tag On—Washer Laundry Stats," 14 pages of screenshots enclosed. Video uploaded on Apr. 18, 2014 by LG USA Home Appliances and Electronics. [Retrieved Oct. 26, 2018]. Video retrieved online via URL: https://www.youtube.com/watch?v=7unSkb2-Hcl.
"LG's new washing machines use NFC to offer more programmes via smartphone," Mar. 19, 2014, 6 pages. [Online] [Retrieved Oct. 26, 2018]. Retrieved online via URL: https://www.pocket-lint.com/smart-home/news/lg/127973-lg-s-new-washing-machines-use-nfc-to-offer-more-programmes-via-smartphone.
"Philips Advance Xitanium LED Drivers with SimpleSet Technology," 25 pages of screenshots enclosed. Video uploaded on Jun. 13, 2014 by Signify. [Retrieved Oct. 26, 2018]. Video retrieved online via URL: https://www.youtube.com/watch?v=Qc3XwdeBvSo.
Notice of Allowance dated Mar. 17, 2017 in connection with U.S. Appl. No. 15/228,183, 8 pages.
Examiner's Report dated Sep. 29, 2016 in connection with CA 2,852,445—4 pages.
Non-Final Office Action dated Oct. 27, 2017 in connection with U.S. Appl. No. 15/611,955—25 pages.
Examiner's Report dated Dec. 28, 2017 in connection with Canadian Patent Application No. 2,892,464—6 pages.
Notice of Allowance dated May 23, 2018 in connection with U.S. Appl. No. 15/611,955—13 pages.
Corrected Notice of Allowance dated Jun. 13, 2018 in connection with U.S. Appl. No. 15/611,955—6 pages.
Examiner's Report dated Jul. 30, 2018 in connection with Canadian Patent Application No. 2,892,464—4 pages.
Non Final Office Action dated Feb. 7, 2019 in connection with U.S. Appl. No. 15/464,023—106 pages.
Ex Parte Quayle dated Apr. 12, 2019 in connection with U.S. Appl. No. 16/108,588—5 pages.
Notice of Allowance dated May 22, 2019 in connection with U.S. Appl. No. 15/464,023—22 pages.
Non-Final Office Action dated Jun. 3, 2019, in connection with U.S. Appl. No. 16/108,588—8 pages.
Provisional U.S. Appl. No. 61/867,326, filed Aug. 19, 2013—98 pages.
Notice of Allowance dated Oct. 23, 2019 in connection with U.S. Appl. No. 16/108,588—9 pages.
Non Final Office Action dated Apr. 1, 2020 in connection with U.S. Appl. No. 16/747,694—8 pages.
Examiner's Report dated May 13, 2020 in connection with Canadian Patent Application No. 3,011,478—3 pages.
Examiner's Report dated Apr. 28, 2021 in connection with Canadian Patent Application No. 3,011,478—4 pages.
Examiner's Report dated Jun. 3, 2021 in connection with Canadian Patent Application No. 3,021,700—5 pages.

* cited by examiner

CONTROLLER AND METHOD, DEVICE AND SYSTEM FOR USE IN CONFIGURING SAME

CROSS-REFERENCE TO RELATED APPLICATION

This application is a continuation claiming the benefit of priority under 35 USC § 120 based on co-pending U.S. patent application Ser. No. 15/464,023, filed on Mar. 20, 2017, which itself was a continuation under 35 USC § 120 of U.S. patent application Ser. No. 14/286,788, filed on May 23, 2014, which issued as U.S. Pat. No. 9,641,959 on May 2, 2017. The contents of the above-noted application are incorporated herein by reference.

FIELD OF THE INVENTION

The present invention relates generally to the field of electronic controllers, and more particularly to a method, device and system for configuring and updating firmware in such electronic controllers.

BACKGROUND

Electronic controllers are commonly used to control the operation of many different household and industrial devices. For example, electronic controllers are used to control the functioning of stoves, blenders, bathing unit systems, audio devices, pumps, motors, keypads, LED intelligent light bulb, lighting devices, displays and restaurant appliances amongst many others.

A same hardware platform can be used in a controller for different variations/models of a device, where the variations/models may be perceptible for example in terms of the features provided by the device. Adapting a hardware platform of an electronic controller to different variations/models of a device sometimes merely amounts to installing different associated software options in a programmable memory of the hardware platform. Such a process is typically referred to as programming or loading the firmware of the controller. For example, depending on the software options provided on the hardware platform of a bathing unit controller, that bathing unit controller may be used for controlling components of either an economy-end bathing unit system (equipped with a basic set of components such as a heater and a single circulation pump) or a high/luxury-end bathing unit system (equipped luxury features such as for example audio/visual devices, jets, lighting device, sanitizing devices and the like). Using a same hardware platform for different variations/models of a device may present advantages in terms of design and production costs since that same hardware platform can be built and used in connection with multiple end devices/systems.

The installation of software options on a hardware platform of an electronic controller is typically performed by the device manufacturer on an assembly line.

A deficiency associated with many conventional methods for installing such software options is that they typically require that the electronic controllers, or portions thereof, be activated (for example by plugging them into an external source of electrical power) prior to and during the installation of the software options. This requirement implies a level of complexity for the assembly line since the latter must be configured with power outlets and connectors for supplying power to the electronic controllers. It also requires that the electronic controllers be physically connected to such power outlets and connectors, by people or machines for example. This in turn adds to the manufacturing cost of the device.

A related deficiency associated with conventional methods for installing software options on electronic controllers of the type presented above is that, once an electronic controller is packaged for shipment, there are no easy techniques for allowing the electronic controller to be configured (or reconfigured) without removing the electronic controller from the packaging and without activating it. As such, the packaging of the electronic controller is often delayed to until after the software options have been installed.

Another deficiency associated with conventional methods for installing software options on electronic controllers of the type presented above is that, in order to update the firmware of the electronic controller, for example to add additional features and/or to correct a defect in the software currently loaded on the electronic controller, the controller must again be activated, which in some cases may not be desirable.

With respect to intelligent LED light bulbs, another deficiency associated with conventional methods for updating firmware of electronic controllers integrated into such LED light bulbs is that there is no suitable way to access the processor inside the bulb to reprogram it or update it, for example to add additional features and/or to correct a defect in the software currently loaded in the light bulb, once the light bulb is manufactured.

In the above cases, the process of configuring or updating the firmware of electronic controllers is either not available or is inconvenient, cumbersome and/or expensive.

In light of the above, it can be seen that there is a need in the industry for a method, system and device that is able to alleviate, at least in part, the deficiencies associated with the traditional methods of configuring the firmware of electronic controllers.

SUMMARY

In accordance with a first aspect, the invention relates to a programmable controller for operating a system. The programmable controller comprises firmware storing instructions for controlling operations of the system, the firmware including a passive memory component. The programmable controller also comprises a processing unit programmed for operating the system at least in part in accordance with the instructions of the firmware.

The firmware is responsive to a signal carrying firmware update information received over a wireless communication link from a device external to the system for drawing energy from the signal to activate the passive memory component and for causing a firmware update process to be performed to update the instructions of the firmware based on the update information carried by the signal. At least part of the firmware update process is performed by the controller while the passive memory component remains activated using energy drawn from the signal.

In accordance with a specific implementation, the passive memory component is configured to be responsive to the signal carrying firmware update information received from the external device for causing at least part of the firmware update process to be performed in the absence of electrical power being supplied to the programmable controller. In a specific practical implementation, at least part of the firmware update process is performed using the signal as the sole source of electrical energy.

In a specific implementation, the passive memory component is configured for communicating with the device external to the system over a radio frequency (RF) communication link, such as for example a short range RF communication link, established between the passive memory component and the device external to the system.

In a very specific practical implementation, the passive memory component includes a near field communication memory (NFC memory) and the device external to the system from which the signal carrying firmware update information is received is embodied in an NFC enabled computing device. Advantageously, the use of an NFC memory on the controller allows the firmware update process to be performed in the absence of a source of electrical power to the controller using energy drawn from the signal transmitted by the NFC enabled computing device.

In a first specific embodiment, the firmware update information may include program code implementing a set of configurations. The set of configurations may include one, two or more distinct configurations.

In a second specific embodiment, the firmware update information may convey an access code. In such an embodiment, the instructions stored on the firmware may implement a set of configurations including at least a first configuration and a second configuration, the access code being associated with a specific one of the first configuration and the second configuration. In this embodiment, the processing unit of the controller may be programmed for operating the system in accordance with the specific one of the first configuration and the second configuration associated with the access code. In a non-limiting implementation, the processing unit is programmed for selecting the specific one of the first configuration and the second configuration at least in part by processing the access code to select a portion of the instructions stored on the firmware, where the selected portion of the instruction implements the specific one of the first configuration and the second configuration.

In accordance with an alternative specific implementation, the instructions for controlling operations of the system include program code implementing a set of configurations including at least a first configuration and a second configuration, the firmware including a memory unit storing this program code. In this implementation, the firmware update information carried by the signal received from the device external to the system is associated with a specific one of the first configuration and the second configuration and the firmware update process includes storing the firmware update information carried by the signal on the passive memory unit. The processing unit of the controller is programmed for selecting a specific configuration from the set of configurations implemented by the program code stored in the memory unit of the firmware at least in part by processing the firmware update information stored on the passive memory component and for operating the system in accordance with the selected specific configuration implemented by the program code stored in the memory unit of the controller.

In a specific practical implementation, the programmable controller is for controlling a system having multiple components. In such an implementation, the processing unit may be programmed for operating a first set of components of the system when operating the system in accordance with the first configuration and for operating a second set of components when operating the system in accordance with the second configuration. The second set of components may be a subset of the first set of components. Alternatively, the second set of components may include at least one component absent from the first set of components.

In a specific practical implementation, the programmable controller may be configured for controlling a bathing unit system having a pump and the processing unit may be programmed for controlling operational settings associated with the pump in a first manner when operating the system in accordance with the first configuration and for controlling operational settings associated with the pump in a second manner different from the first manner when operating the system in accordance with the second configuration.

In accordance with another aspect, the invention relates to a system comprising a set of components and a programmable controller of the type described above in communication with and for controlling at least some of the components in the set of components.

In accordance with another aspect, the invention relates to a system comprising a motor and a programmable controller of the type described above, wherein the programmable controller is configured for operating the motor.

In accordance with another aspect, the invention relates to an intelligent LED light bulb comprising an LED light element and a programmable controller of the type described above, wherein the programmable controller is configured for operating the LED light element.

In accordance with another aspect, the invention relates to a system comprising a heating element and a programmable controller of the type described above, wherein the programmable controller is configured for operating the heating element.

In accordance with another aspect, the invention relates to a restaurant appliance comprising a programmable controller of the type described above, wherein the programmable controller is configured for operating the restaurant appliance.

In accordance with another aspect, the invention relates to an auxiliary device suitable for configuring a controller of a system, the controller comprising firmware storing instructions for controlling operations of the system, the firmware including a passive memory component. The controller is programmed for operating the system at least in part in accordance with the instructions stored on the firmware. The auxiliary device comprises a communication interface suitable for communicating with the controller of the system over a wireless communication link. The auxiliary device also comprises a processing unit in communication with the communication interface, the processing unit being programmed for transmitting a signal over the wireless communication link to the controller, wherein the signal carries firmware update information associated with the system. The transmitted signal is configured for causing the passive memory component of the controller to be activated by drawing energy from the signal and causing a firmware update process to be performed by the controller to update the instructions of the firmware based on the update information carried by the signal. At least part of the firmware update process is performed by the controller while the passive memory component remains activated using energy drawn from the signal.

In a specific implementation, the auxiliary device communicates with the controller of the system over a radio frequency (RF) communication link, such as for example a short range RF communication link, in order to transmit the signal carrying firmware update information associated with the system.

In a specific practical implementation, the auxiliary device is embodied in an NFC enabled computing device and the passive memory component of the controller with which it communicates includes an NFC memory. In a non-limiting implementation, the NFC enabled computing device may be embodied as a smartphone.

In a specific implementation, the firmware update information carried by the signal includes program code implementing a specific configuration associated with a specific variation of the system. The firmware update process causes the program code implementing the specific configuration to be stored on the firmware of the controller to enable the controller of the system to operate the system based on the specific configuration implemented by the program code implemented by the firmware update information.

In an alternative specific implementation, the firmware of the controller stores program code implementing a set of configurations including at least a first configuration and a second configuration and the firmware update information carried by the signal conveys an access code associated with a specific one of the first configuration and the second configuration. In this alternative specific embodiment, the firmware update process causes the access code to be stored on the passive memory component of the firmware to enable the controller to select the specific one of the first configuration and the second configuration with which the access code is associated and to operate the system in accordance with the selected specific one of the first configuration and the second configuration.

In accordance with some specific implementations, the firmware update information carried by the signal may include program code implementing a set of configurations, including a first configuration and/or a second configuration. In practical implementations, the first configuration may be for enabling the controller of the system to operate a first set of components of the system and the second configuration may be for enabling the controller of the system to operate a second set of components of the system. The second set of components may be a subset of the first set of components or, alternatively, the second set of components may include at least one component absent from the first set of components.

In accordance with some specific practical implementations, the first configuration may be for enabling the controller of the system to control operational settings associated with a component in a first manner and the second configuration may be for enabling the controller of the system to control the operational settings associated with the component in a second manner.

In accordance with another aspect, the invention relates to a method for configuring a controller of a system, the controller comprising firmware storing instructions for controlling operations of the system. The firmware includes a passive memory component and the controller is programmed for operating the system at least in part in accordance with the instructions stored on the firmware. The method comprises: using an auxiliary device, obtaining firmware update information associated with the system and transmitting a signal carrying firmware update information associated with the system to the controller over a wireless communication link. The transmitted signal is configured for causing the passive memory component of the controller to be activated by drawing energy from the signal and for causing a firmware update process to be performed by the controller of the system to update the instructions of the firmware based on the update information carried by the signal. At least part of the firmware update process is performed by the controller while the passive memory component remains activated using energy drawn from the signal.

In accordance with a specific implementation, the wireless communication link over which the signal carrying the firmware update information associated with the system is transmitted is a radio frequency (RF) communication link such as for example a short range RF communication link, established between the passive memory component and the auxiliary device.

In accordance with a specific implementation, the auxiliary device is embodied in an NFC enabled computing device. In such an embodiment, the passive memory component of the controller may also include an NFC memory in order to allow communication between the NFC enabled computing device and the controller. In a non-limiting implementation, the NFC enabled device may be embodied in a smartphone or any other suitable device.

In accordance with a specific implementation, the firmware update information carried by the signal includes program code implementing a specific configuration associated with a specific variation of the system. In such an implementation, the firmware update process causes the program code implementing the specific configuration to be stored on the firmware of the controller to enable the controller of the system to operate the system based on the specific configuration implemented by the program code implemented by the firmware update information.

In accordance with a specific implementation, the firmware of the controller stores program code implementing a set of configurations including at least a first configuration and a second configuration and the firmware update information carried by the signal conveys an access code associated with a specific one of the first configuration and the second configuration. In such an implementation, the firmware update process causes the access code to be stored on the passive memory component of the firmware to enable the controller to select the specific one of the first configuration and the second configuration to which the access code is associated and to operate the system in accordance with the selected specific one of the first configuration and the second configuration.

In accordance with a specific implementation, the firmware update information carried by the signal includes program code implementing a set of configurations, the set of configurations including at least a first configuration and a second configuration. In a specific embodiment, the first configuration is for enabling the controller of the system to operate a first set of components of the system and the second configuration is for enabling the controller of the system to operate a second set of components of the system. The second set of components may be a subset of first set of components or, alternatively, may include one or more components absent from the first set of components.

In addition to the above, or alternatively, the first configuration is for enabling the controller of the system to control operational settings associated with a component in a first manner and the second configuration is for enabling the controller of the system to control the operational settings associated with the component in a second manner.

In accordance with another aspect, the invention relates to a manufacturing process for configuring a controller comprising firmware including a passive memory component. The controller is configurable for operating a specific one of a plurality of variations of a device at least in part in dependence of instructions stored on the firmware. The manufacturing process includes a device for implementation a method of the type defined above for configuring the controller.

In accordance with another aspect, the invention relates to a computer program product, tangibly stored on one or more tangible computer readable storage media, for configuring a controller of a system. The controller comprises firmware storing instructions for controlling operations of the system and is programmed for operating the system at least in part in accordance with the instructions stored on the firmware. The firmware includes a passive memory component The computer program product comprises instructions that, when executed, cause a programmable device including at least one programmable processor to perform operations. The operations comprise obtaining firmware update information associated with the system and transmitting a signal carrying the firmware update information associated with the system to the controller over a wireless communication link. The transmitted signal is configured for causing the passive memory component of the controller to be activated by drawing energy from the signal and for causing a firmware update process to be performed by the controller of the system to update the instructions of the firmware based on the update information carried by the signal. At least part of the firmware update process is performed by the controller while the passive memory component remains activated using energy drawn from the signal.

In accordance with a specific implementation, the programmable device by which the instructions of the computer program product may be executed is embodied in an NFC enabled computing device. In such an embodiment, the passive memory component of the controller may also include an NFC memory in order to allow communication between the NFC enabled computing device and the controller. In a non-limiting implementation, the NFC enabled device may be embodied in a smartphone or any other suitable device.

In accordance with a specific implementation, the firmware update information carried by the signal includes program code implementing a specific configuration associated with a specific variation of the system. The firmware update process causes the program code implementing the specific configuration to be stored on the firmware of the controller to enable the controller of the system to operate the system in accordance with the specific configuration implemented by the program code included in the firmware update information.

In accordance with an alternative implementation, the firmware of the controller stores program code implementing a set of configurations including at least a first configuration and a second configuration and the firmware update information carried by the signal conveys an access code associated with a specific one of the first configuration and the second configuration. The firmware update process causes the access code to be stored on the passive memory component of the firmware to enable the controller to select the specific one of the first configuration and the second configuration to which the access code is associated and to operate the system in accordance with the selected specific one of the first configuration and the second configuration.

In accordance with another aspect, the invention relates to a programmable controller for operating a system having a motor. The programmable controller comprises firmware storing instructions for controlling operations of the system, the firmware including a passive memory component. The processing unit is programmed for operating the motor at least in part in accordance with the instructions of the firmware. The firmware is responsive to a signal carrying firmware update information received over a wireless communication link from a device external to the system for drawing energy from the signal to activate the passive memory component and for causing a firmware update process to be performed to update the instructions of the firmware based on the update information carried by the signal. At least part of the firmware update process is performed by the controller while the passive memory component remains activated using energy drawn from the signal.

In a specific practical implementation, the passive memory component includes a near field communication memory (NFC memory) and the device external to the system from which the signal carrying firmware update information is received is embodied in an NFC enabled computing device.

In accordance with another aspect, the invention relates to a controller for operating a device. The controller comprises firmware including a passive memory component. The processing unit is programmed for operating the device and for storing data conveying operational characteristics of the device on the passive memory component of the firmware. The firmware is responsive to a signal carrying a device status request received over a wireless communication link from a device external to the system for drawing energy from the signal to activate the passive memory component and for causing a reply signal conveying at least part of the data stored on the passive memory device to be transmitted to the device external to the system. The transmittal of the reply signal to the device external to the system is performed by the controller while the passive memory component remains activated using energy drawn from the signal carrying the device status request.

In accordance with a specific implementation, the passive memory component is configured to transmit the reply signal to the device external to the system in the absence of electrical power being supplied to the programmable controller. In a specific practical implementation, the transmittal of the reply signal is performed using the signal carrying the device status request as the sole source of electrical energy.

In a specific implementation, the passive memory component is configured for communicating with the device external to the system over a radio frequency (RF) communication link, such as for example a short range RF communication link, established between the passive memory component and the device external to the system.

In a very specific practical implementation, the passive memory component includes a near field communication memory (NFC memory) and the device external to the system from which is received the signal carrying the device status request is embodied in an NFC enabled computing device. Advantageously, the use of an NFC memory on the controller allows the transmittal of the reply signal to be performed in the absence of a source of electrical power to the controller.

These and other aspects and features of the present invention will now become apparent to those of ordinary skill in the art upon review of the following description of specific embodiments of the invention and the accompanying drawings.

Other aspects and features of the present invention will become apparent to those ordinarily skilled in the art upon review of the following description of specific embodiments of the invention in conjunction with the accompanying figures.

DETAILED DESCRIPTION

Figure 1:
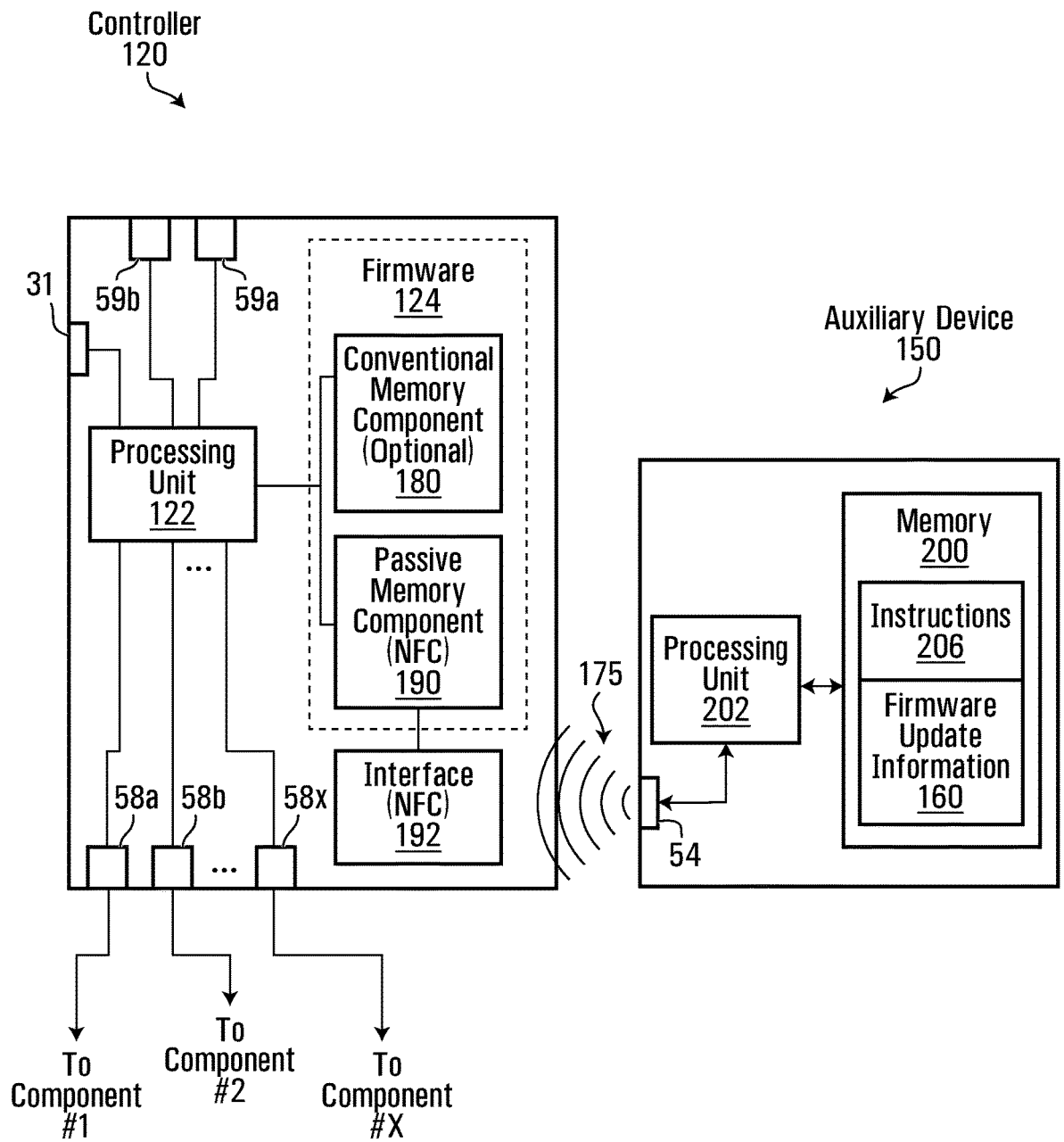
FIG. 1 shows a functional block diagram of a programmable controller and of an auxiliary device for configuring the programmable controller in accordance with a non-limiting example of implementation of the present invention.

FIG. 1 illustrates a block diagram of a programmable controller 120 and of an auxiliary device 150 used for configuring the programmable controller 120 in accordance with a specific example of implementation of the present invention.

The auxiliary device 150 and the controller 120 are configured to establish a communication link 175 therebetween for enabling the controller 120 to receive information from, and/or transmit information to, the auxiliary device 150 even in the absence of electrical power being supplied to the controller 120 by an external electrical power source. As will be described in more detail below, the concepts presented here may be used for example for one or more of the following:

(1) to allow the auxiliary device 150 to provide firmware update information to the controller 120 even in the absence of electrical power being supplied to the controller 120 by an external electrical power source;

(2) to allow the controller 120 to provide diagnostic information associated with the operation of the controller 120 to the auxiliary device 150 even in the absence of electrical power being supplied to the controller 120 by an external electrical power source.

The description presented here focuses more particularly on the purpose identified in (1) above, namely allowing the auxiliary device 150 to provide firmware update information to the controller 120 even in the absence of electrical power being supplied to the controller 120 by an external electrical power source. However the person skilled in the art, in light of the present description, will readily appreciate how the auxiliary device 150 and the controller 120 may be modified in to achieve the purpose identified in (2).

Each of these components 120 and 150, as well examples of the manners in which they may interact, will now be described in greater detail.

Programmable Controller 120

As shown, the programmable controller 120 includes a hardware platform having firmware 124, including a passive memory component 190, and a processing unit 122 in communication with the firmware 124. The controller 120 may be for controlling the operation of one of any number of household and/or industrial devices such as, without being limited to stoves, blenders, bathing unit systems, audio devices, pumps, keypads, (intelligent) LED light bulbs, displays, motors and restaurant appliances amongst others.

The programmable controller 120 is equipped with the necessary circuitry and ports to allow it to receive, during operation, electrical power from any suitable external source electrical power (not shown in the figures). In the example depicted, the connection of programmable controller 120 to a suitable external source of electrical power is depicted as port 31. In a first non-limiting example, port 31 may be configured with the necessary components and circuitry for connecting the programmable controller 120 to a suitable external source of electrical power via service wiring to supply the programmable controller 120 with any conventional power service suitable for residential or commercial use. In a second non-limiting example, the external source of electrical power may be in the form of a battery pack associated with the programmable controller 120 and port 31 may be configured with the necessary components and circuitry for connecting the programmable controller 120 to such battery pack.

The programmable controller 120 may also include a set of component control ports 58 (including in this embodiment component control ports 58a, 58b . . . 58x) for communicating with components of the device (or system) it is configured to control and one or more input interface ports 59 (including in this embodiment input interface ports 59a, 59b) for receiving control signals for the device or system the programmable controller 120 is made to control. While in the example of FIG. 1 the controller 120 is shown as having a set including three component control ports 58a, 58b, 58x and two input interface ports 59a and 59b, it should be understood that in practical implementation, the controller 120 may be equipped with any suitable number of component control ports and any suitable number of input interface ports in dependence on the device (or system) it is configured to control.

The programmable controller 120 may use the electrical power it receives from the external power source through port 31 to operate the processing unit 122. The processing unit 122 of the programmable controller 120 is also configured to control the distribution of power received through port 31 to the components of the device through the set of component control ports 58 on based on program instructions stored in the firmware 124 and optionally based information received through input interface ports 59 in order to cause the desired operation to be performed by the device or system. Having regard to the distribution of the electrical power to components by the controller 120, it noted that suitable circuitry, such as relays, switches and the like (not shown), may also be provided on some hardware platforms.

In a first practical implementation, the controller 120 may be made for controlling the operation of a bathing unit system including a plurality of bathing unit components (for example a heater, a pump, a sanitization device etc. . . . ), sensing devices (for example water level sensors, temperature probes, etc. . . . ) and a user control interface. In this example, component control ports 58 may be made for connection to the bathing unit components and input interface ports 59 may be made for communication with the sensing devices and/or with the user control interface. In this non-limiting implementation, the processing unit 122 may control the supply of power to the bathing unit components through ports 58 based upon the program instructions stored in the firmware 124 and based upon information received from the sensing devices and/or user control interface through ports 59.

In a second non-limiting example of implementation, the programmable controller 120 may be made for controlling the operation of a stove including a plurality of heating elements and user operable controls. In this non-limiting example, the ports in the set of component control ports 58 may be made to be connected to respective heating elements and the input interface ports 59 may be made to be in communication with the user operable controls. In this example, the processing unit 122 may control the supply of power to different heating elements based upon the program instructions stored in the firmware 124 and based upon instruction signals received from the user operable controls through ports 59.

In a third non-limiting example of implementation, the programmable controller 120 may be made for controlling the operation of a device including a motor and user operable controls. In this non-limiting example, the ports in the set of component control ports 58 may be made to be connected to the motor and the input interface ports 59 may be made to be in communication with the user operable controls. In this example, the processing unit 122 may control the supply of power to the motor to control for example the activation of the motor, and optionally to control the speed of the motor, based upon the program instructions stored in the firmware 124 and based upon instruction signals received from the user operable controls through ports 59.

In a fourth non-limiting example of implementation, the programmable controller 120 may be made for controlling the operation of an intelligent LED light bulb. In this non-limiting example, the ports in the set of component control ports 58 may be made to be connected to the LED elements and the input interface ports 59 may be made to be in communication with a user operable control. In a non-limiting example, at least one of the input interface ports 59 is in the form of a wireless receiver. In this example, the processing unit 122 may control the supply of power to the LED bulb to control for example, the activation of the LED bulb, the dimming intensity of the LED light bulb, the color of the light emitted by the LED bulb and/or to create special lighting effects, based upon the program instructions stored in the firmware 124 and based upon instruction signals received from the user operable controls through ports 59.

In practical implementations, the hardware platform of the controller 120 will typically include one or more circuit boards on which various circuit elements, including the passive memory component 190, will be provided and interconnected for enabling the desired functionality. The hardware platform of the controller 120 may be enclosed in a controller housing (not shown in FIG. 1), which provide amongst other a protection from external elements. The housing for controller 120 may have any suitable shape for enclosing the electrical circuitry, including the processing unit 122 and the firmware 124 (not shown), of the controller 120.

It is a feature of the programmable controller 120 that it can be adapted to control different variations/models of a device (or a system) in part by installing different associated software options in the firmware 124. Of particular interest in the present document is the configuration/updating of the firmware 124 of the programmable controller 120 in the absence of electrical power being supplied to the controller 120 by an external electrical power source through port 31. As such, the particularity of the functionality and circuitry required for receiving electrical power from an electric power source through port 31 during operation and for distributing electrical power to different components through the set of ports 58 is not critical to the present invention and will not be described further here.

As mentioned above, the programmable controller 120 includes firmware 124 and a processing unit 122. The processing unit 122 is programmed for operating a device (or a system) taking into account instructions and/or data stored on the firmware 124, which allows the controller 122 to be used for different variations/models of a device (where the variations/models may be perceptible for example in terms of the features provided by the device) based on the program instructions stored on the firmware 124.

According to an embodiment of the invention, the firmware 124 includes a passive memory component 190. Optionally the firmware 124 may also include an additional memory component 180, which may be of a conventional (or non-passive) memory type. The additional memory unit 180 may store instructions and/or data for controlling the operation of the device or system in addition to the instructions and/or data stored on the passive memory component 190. Optionally in such cases, the processing unit 122 once activated may make use of instructions and/or data stored on the passive memory component 190 to modify, select, or replace instructions in the memory unit 180. In the embodiment depicted, the optional memory unit 180 is of any suitable conventional type and may require an external source of electrical power in order to operate.

The passive memory component 190 for the firmware 124 does not require electrical power to function but rather can operate by drawing electrical power from specific types of signals it is configured for receiving. In a first practical implementation, the passive memory component 190 is built with any suitable hardware components responsive to radio frequency (RF) signals for drawing energy from such signals in such a way as to activate the passive memory component 190.

In practical implementations, the passive memory component 190 may include any suitable commercially available near field communication memory (NFC memory).

Generally speaking, near field communication (NFC) is a communication standards for allowing devices to establish radio communication with each other by touching them together or bringing them into close proximity, usually no more than a few inches although greater ranges are also possible. In specific implementations using NFC, theoretical working distance with compact standard antennas is currently up to about 20 cm, however the practical working distance is about 4 cm. Current NFC standards cover communications protocols and data exchange formats, and are based on existing radio-frequency identification (RFID) standards including ISO/IEC 14443 and FeliCa. NFC builds upon RFID systems by allowing two-way communication between endpoints, where earlier systems such as contactless smart cards were one-way only. Generally speaking, near-field communication uses magnetic induction between two loop antennas located within each other's near field, effectively forming an air-core transformer. In a non-limiting implementation, NFC devices operate within the globally available and unlicensed radio frequency ISM band of 13.56 MHz, although any suitable RF band can be contemplated in alternative implementations.

NFC memory devices of the type contemplated are caused to be activated by a radio frequency (RF) signal transmitted by an NFC enabled auxiliary device 150. Typically such RF signal will be transmitted over a short range RF communication link established between the passive memory component 190 and an external device, such as the auxiliary device 150. Alternatively the passive memory component 190 may include an RFID memory instead of an NFC memory. In such an alternative implementation, the RFID memory is configured to be activated by a radio frequency (RF) signal transmitted by an auxiliary device 150 equipped with an RFID transponder. The controller 120 also includes an interface 192 allowing signals originating from an external device and directed to the passive memory component 190 to propagate so that is reaches the passive memory component 190.

Once the passive memory component 190 is activated by the signal carrying firmware update information originating from the auxiliary device 150, the firmware update information in the signal causes a firmware update process to be performed on the firmware 124. In particular, at least part of the firmware update process is performed in the absence of electrical power being supplied to the programmable controller 120. In specific practical implementations, at least part of the firmware update process may be performed using the signal as the sole source of electrical energy. The firmware update process may modify and/or replace program instructions and/or data stored on the passive memory component 190 based on the firmware update information carried by the signal. At least part of the firmware update process is performed on the passive memory component 190 of the firmware 124 while the passive memory component 190 remains activated using energy drawn from the signal received from the auxiliary device 150.

The manner in which programmable controller 120 can be configured for different variations/models of a device that it is made to control can be done in at least two different manners.

In accordance with a first non-limiting embodiment, the structure and software required for the different available variations/models of the device are already stored within the firmware 124 of controller 120. In other words, the firmware 124 is pre-programmed such that it includes the structure and the different sets of program instructions necessary for causing the controller 120 to acquire different configurations, each configuration being associated with a respective variation/model of a device or system. In a non-limiting practical implementation, such instructions may be stored on the additional memory unit 180 however it is to be understood that such instructions or a portion therefore may alternatively be stored on the passive memory component.

In accordance with the second non-limiting embodiment, program instructions for different available variations/models of a device or system are not pre-stored within the firmware 124. Instead, in order to configure the controller 120 for a specific variations/model of a device or system, program instructions for causing the controller 120 to acquire a specific configuration are provided by an external source during a configuration process and stored on the firmware 124.

Examples of the manner in which the controller 120 may be configuration for each of the above two situations will now be described in the sections that follow.

Pre-Stored Configurations on the Firmware 124

Referring back to the first non-limiting embodiment in which structure and software required for the different available variations/models of the device or system are already stored within the firmware 124. The firmware 124 of the controller 120 stores a first set of program instructions that when activated cause the controller 120 to acquire a first configuration, and a second set of program instructions that when activated cause the controller 120 to acquire a second configuration. In a specific implementation, the first configuration is associated with a first specific variation/model of the device or system that the controller is intended to control and the second configuration is associated with a second specific variation/model of the device or system that the controller is intended to control. Although only two sets of program instructions are mentioned here, it should be appreciated that any number of sets of program instructions could be stored within the firmware 124. The instructions may be stored on the passive memory component 190 and/or may be stored on the conventional memory component 180.

In order to cause the controller 120 to be configured for a specific variations/model of a device, the controller 120 is caused to implement a given set of program instructions from the pre-stored sets of program instructions. As mentioned above, the different sets of program instructions are operative for causing the controller 120 to acquire different configurations.

Taking a non-limiting example in which the controller 120 may be made for controlling the operation of a bathing unit system, the first set of program instructions may be operative for configuring the controller 120 to control a high-end bathing unit system, and the second set of program instructions may be operative for configuring the controller to control a lower-end bathing unit system. The high-end bathing unit system may require the controller 120 to control a first set of bathing unit components that includes a heating module, air pumps, an air blower, an ozonator, a CD player, a DVD player and lighting units. In contrast, a low-end bathing unit system may require the controller 120 to control a second set of bathing unit components that is a reduced set that includes only the heating module, air pumps and air blower. Alternatively, the first and second set of program instructions may cause the controller 120 to control the same set of bathing unit components, but the first set of program instructions configures the controller 120 to control these components in a different way, for example by providing more settings for the individual components than the second set of program instructions. For example the first set of program instruction may control a pump in the bathing unit system in a first manner, for example by providing multiple speeds for the pump, while the second set of program instruction may control the pump in the bathing unit system in a second manner, for example by providing one a single speed for the pump. In yet a further alternative, the first and second set of program instructions may configure the controller 120 to control completely different sets of bathing unit components.

Taking another non-limiting example in which the controller 120 may be made for controlling the operation of a stove, the first set of program instructions may be operative for configuring the controller 120 to control a high-end stove and the second set of program instructions may be operative for configuring the controller to control a lower-end stove. The high-end stove may require the controller 120 to control a first set of heating element that may include conventional heating elements, high-performance heating elements and induction heating elements. In contrast, a low-end bathing unit system may require the controller 120 to control a second set of heating elements that is a reduced set and includes only the conventional heating elements. Alternatively, the first and second set of program instructions may cause the controller 120 to control the same set of heating elements, but the first set of program instructions configures the controller 120 to control more settings of the individual heating elements. In yet a further alternative, the first and second set of program instructions may configure the controller 120 to control completely different sets of heating elements.

Again, although only two sets of program instructions for configuring the controller 120 in two different ways are being described herein, the controller 120 may be suitable for pre-storing any number of sets of program instructions for acquiring any suitable number of different configurations.

In accordance with a specific implementation, the information necessary for causing the controller 120 to acquire one of the configurations that has been pre-stored within the controller's firmware 124 is stored in the passive memory component 190 as part of a firmware update process. More specifically, the passive memory component 190 is responsive to a signal carrying firmware update information received from the auxiliary device 150 for drawing energy from that signal to activate the passive memory component 190 and causing at least part of a firmware update process to be performed.

The firmware update information carried by the received signal may be stored on passive memory component 190 and may be operative for configuring the controller 120 by causing one of the pre-stored sets of program instructions to be implemented such that the controller 120 operates by executing the implemented set of program instructions. The information stored on the passive memory component 190 as part of the firmware update process may include an access code, or a set of program instructions, that may be processed by the processing unit 122 of the controller 120 for causing the controller 120 to select a set of program instructions from the pre-stored set of program instructions on the firmware 124.

In a specific implementation, part of the firmware update process may include storing at least part of the firmware update information on the passive memory component 124 while the passive memory component 124 remains activated using energy drawn from the signal received from the auxiliary device.

In some embodiments, another part of the firmware update process may be performed by the processing unit 122 once it becomes activated using an external source of electric power. In particular, in a specific implementation, the processing unit 122, once it becomes activated using an external source of electric power, is configured for processing the information stored on passive memory component 190 in order to cause controller 120 to acquire one of the configurations that has been pre-stored within the controller's firmware 124 as part of the firmware update process. The information stored on the passive memory component 190 and that allows the controller 120 to acquire one of the configurations that has been pre-stored within the controller's firmware 124 may include a single access code, or a single program element, that acts as a key to select the appropriate set of program instructions that are pre-stored within the firmware 124 of the controller 120. In a non-limiting example, the processing unit 122 is programmed for selecting the specific configuration stored in the firmware 124 at least in part by processing the access code, or for executing the single program element, to select a portion of the instructions stored on the firmware 124, where the selected portion of the instruction implements the specific configuration.

Not all Configurations Pre-Stored on the Firmware 124

Referring now to the embodiment in which the firmware 124 of the controller 120 does not store program instructions for all different available variations/models of the device that the controller may be configured to operate, firmware update information including a set of program instructions may be provided to the passive memory component 190 through a signal originating from auxiliary device 150. The set of program instructions is associated with a specific variation/model of the device to be controlled. As such, the signal received from the auxiliary device 150 and conveying firmware update information 160 is operative for configuring the controller 120 by causing a set of program instructions to be uploaded to and stored on the passive memory component 190 of the controller 120.

Optional Error Log

Optionally, the processing unit 122 may further be programmed to maintain an error log on the passive memory component 190 of the firmware 124 to keep track of errors and (or) malfunctions that may occur during operation of the controller 120. For example, processing unit 122 may be programmed for storing on the passive memory component 190 data conveying operational characteristics of the device it is controlling, such as for example current/voltage characteristics, error messages, data conveying improper operation and the like. A person skilled in the art will appreciated that such information stored in an error log may provide some insight during servicing of the controller 120 and may facilitate trouble shooting and repair of the controller during its operational life by allowing the technician to access the data without have to activate the controller 120. The error log may include a variety of different types of data associated with the operation of the controller 120. The specific content of the error log is not critical to the invention and will therefore not be described in further detail here.

In specific practical implementations, the passive memory component 190 of the controller 120 may be comprised of distinct memory subcomponents, wherein each memory subcomponent may store different types of data and/or instructions. For example one memory subcomponent may be for storing firmware update information in the form of data and/or instructions and another memory subcomponent may be for storing device status information (such as an error log). In such an implementation, the memory subcomponent storing the device status information may be responsive to a signal originating from auxiliary device 150 carrying a first type of information (a device status request) while another memory subcomponent may be for storing firmware update information and may be responsive to a signal carrying a second type of information (firmware update information).

Now that an example of a structure of the programmable controller 120 has been presented, we now turn to the auxiliary device 150.

Auxiliary Device 150

As shown in FIG. 1, the auxiliary device 150 includes a processing unit 202, a memory 200 in communication with the processing unit 202 via a data communication bus and a communication interface 54. In practical implementations, the communication interface 54 may include an RF transceiver to enable the auxiliary device 150 to communicate with the controller 120 over a short range RF communication link 175 established between the passive memory component 190 and the auxiliary device 150. Obviously, in order for the interface 54 on the auxiliary device 150 to establish a communication link with the interface 192 on the controller 120, the two types of interfaces 192 and 54 should be compatible.

In practical implementations in which the passive memory component 190 includes a near field communication memory (NFC memory), the auxiliary device 150 is an NFC enabled device and the communication interface 54 includes an NFC transceiver. In this particular example, the auxiliary device 150 may be embodied as a NFC enabled PDA, NFC enabled smart phone, NFC enabled dedicated firmware update device or any other suitable type of NFC enabled device.

In practical implementations in which the passive memory component 190 includes a RFID memory, the auxiliary device 150 includes an RFID reader and the communication interface 54 includes an RFID transceiver.

The auxiliary device 150 is programmed with suitable software instructions 206 for allowing the auxiliary device 150 to obtain and store in its memory 200 firmware update information 160 in association with the programmable controller 120. The auxiliary device 150 may obtain the firmware update information 160 in any number of suitable ways including, without being limited to: (i) accessing a remote server over a network, wherein remote server may store the firmware update information; (ii) receiving a communication (such as an e-mail message over a network from another device conveying the firmware update information; and/or (iii) establishing a communication link over a communication interface with a memory device, such as a USB stick, wherein the memory device stores the firmware update information. Optionally the auxiliary device 150 may be programmed with suitable software instructions 206 for allowing the auxiliary device 150 to obtain and store in its memory an error log (not shown) in association with the programmable controller 120.

The auxiliary device 150 is also programmed with suitable software instructions 206 for transmitting signals over a wireless communication link 175 established between itself and the controller 120.

In a specific example of implementation, a signal transmitted from the auxiliary device 150 conveys firmware update information and is configured for causing the passive memory component 190 of the controller to be activated by drawing energy from that signal. Following this, the signal is configured for causing a firmware update process to be performed at the passive memory component 190 based on the update information carried by the signal. At least part of this update process can advantageously be performed while the passive memory component 190 remains activated using energy drawn from the signal and without requiring electrical power to be supplied from an external source.

Referring back to the non-limiting embodiment in which structure and software required for the different available variations/models of the device or system are already pre-stored within the firmware 124, the firmware update information 160 within the auxiliary device 150 provides the information necessary for causing the controller 120 to acquire one of the pre-stored configurations. The firmware update information 160 stored on the auxiliary device 150 may include a code, or a set of program instructions, for causing the controller 120 to select from the firmware 124 a set of program instructions from the pre-stored set of program instructions. The firmware update information 160 that is stored on the auxiliary device 150 may include a single access code, or a single program element, that acts as a key to select the appropriate set of program instructions that are pre-stored within the firmware 124 of the controller 120.

Referring now to the alternative non-limiting embodiment in which program instructions for different available variations/models of the device are not all pre-stored within the firmware 124 of the controller, the firmware update information 160 provided by the auxiliary device 150 may include one or more sets of program instructions that can be uploaded to the controller 120, wherein each set of program instructions is associated with a respective configuration. The firmware update information 160 may include only a single set of program instructions associated to a specific variation/model of the device to be controlled. Alternatively, the firmware update information 160 stored on the auxiliary device 150 can include a plurality of sets of program instructions, such that each set of program instructions would configure the controller 120 in a different way and be associated with a respective variations/model of the device to be controlled by the controller 120. The appropriate set of program instructions to be provided to the controller 120 can be selected based on a selection made by a user, and/or based on an input of a serial number, and/or based on other selection criteria, provided via an interface provided on the auxiliary device 150.

In a non-limiting example of implementation, it is possible that the firmware update information 160 includes a program element, such as an "autoexec" file, that provides the controller 120 with the necessary information to complete the configuration process when the controller is later activated after being connected to a source of electrical power.

Figure 2:
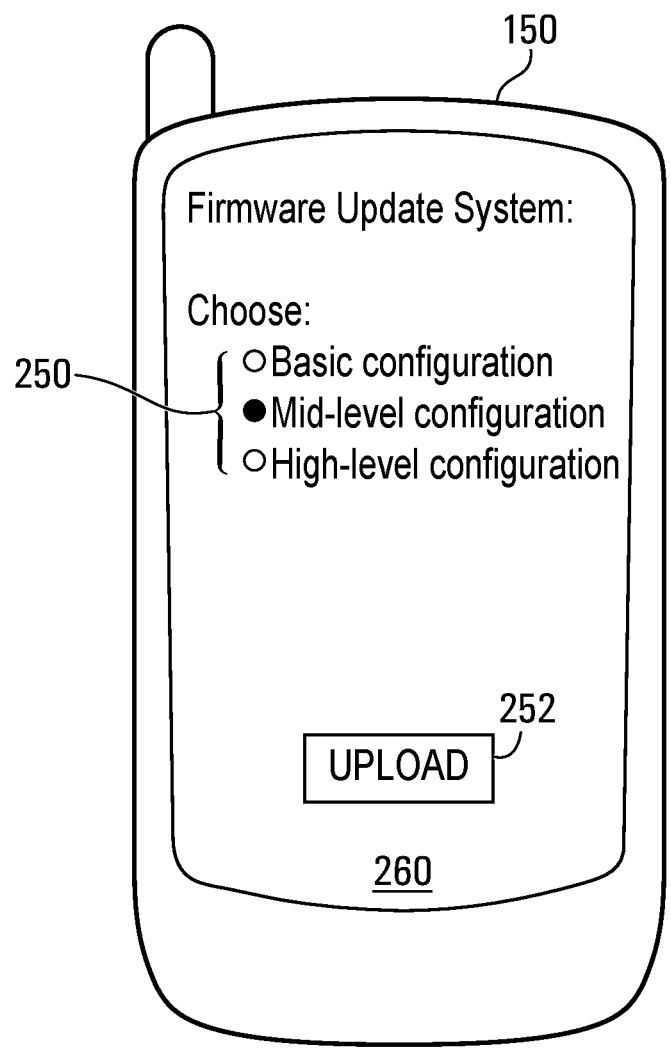
FIG. 2 shows an auxiliary device having a display screen on which a user interface in accordance with a non-limiting example of implementation is displayed.

FIG. 2 shows an auxiliary device 150 in the form of a smartphone 150' having a display screen on which a user interface 260 in accordance with a non-limiting example of implementation is displayed. The user interface 260 presents the user with a set of user selectable items 250, wherein each item in the set is associated with a respective variation/model of a device to be controlled by the controller 120. In the example depicted three variations/models of such a device are provided as options namely: a basic configuration; a mid-level configuration and a high level configuration. Each option for a variation/model of the device is associated with corresponding firmware update information. The set of user selectable items 250 is provided with user operable controls, which in the example depicted variations/model of the device are in the form of radio buttons, to enable a user of the smart phone 150' to make a selection. The interface 260 is also provided with a control 252. When actuated, the control 252 causes the auxiliary device 150 to generate and transmit a signal to the controller 120 over communication link 175, the signal carrying firmware update information associated with the selected configuration. It is to be appreciated that the example depicted in FIG. 2 is but one possible example of implementation and that many alternative embodiments are possible and will become apparent to the person skilled in the art in light of the present description.

The firmware update information carried by the signal transmitted from the auxiliary device 150 to the controller may convey, for example, program instructions, data, and/or one or more access codes associated with the sets of program instructions stored in the firmware 124 of the controller.

Process for Configuring Controller 120

Figure 3:
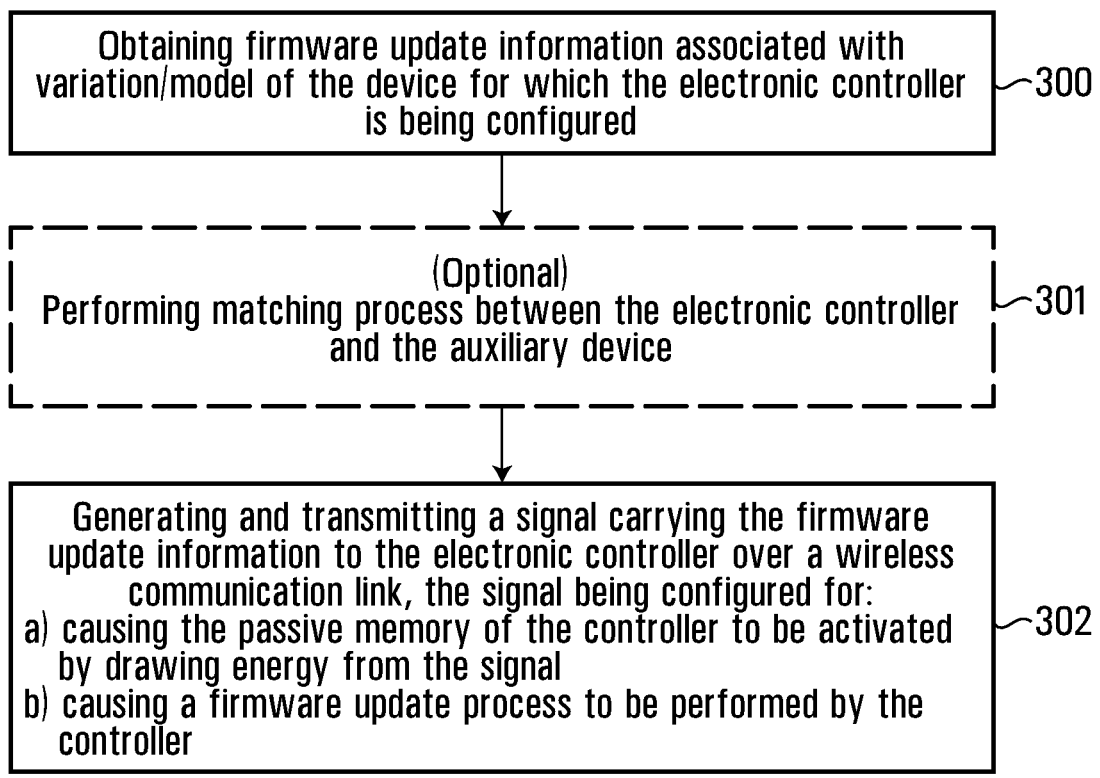
FIGS. 3 and 4 are flow diagrams of processes for configuring the programmable controller shown in FIG. 1 using the auxiliary device shown in FIG. 1 in accordance with a non-limiting example of implementation of the present invention.
Figure 4:
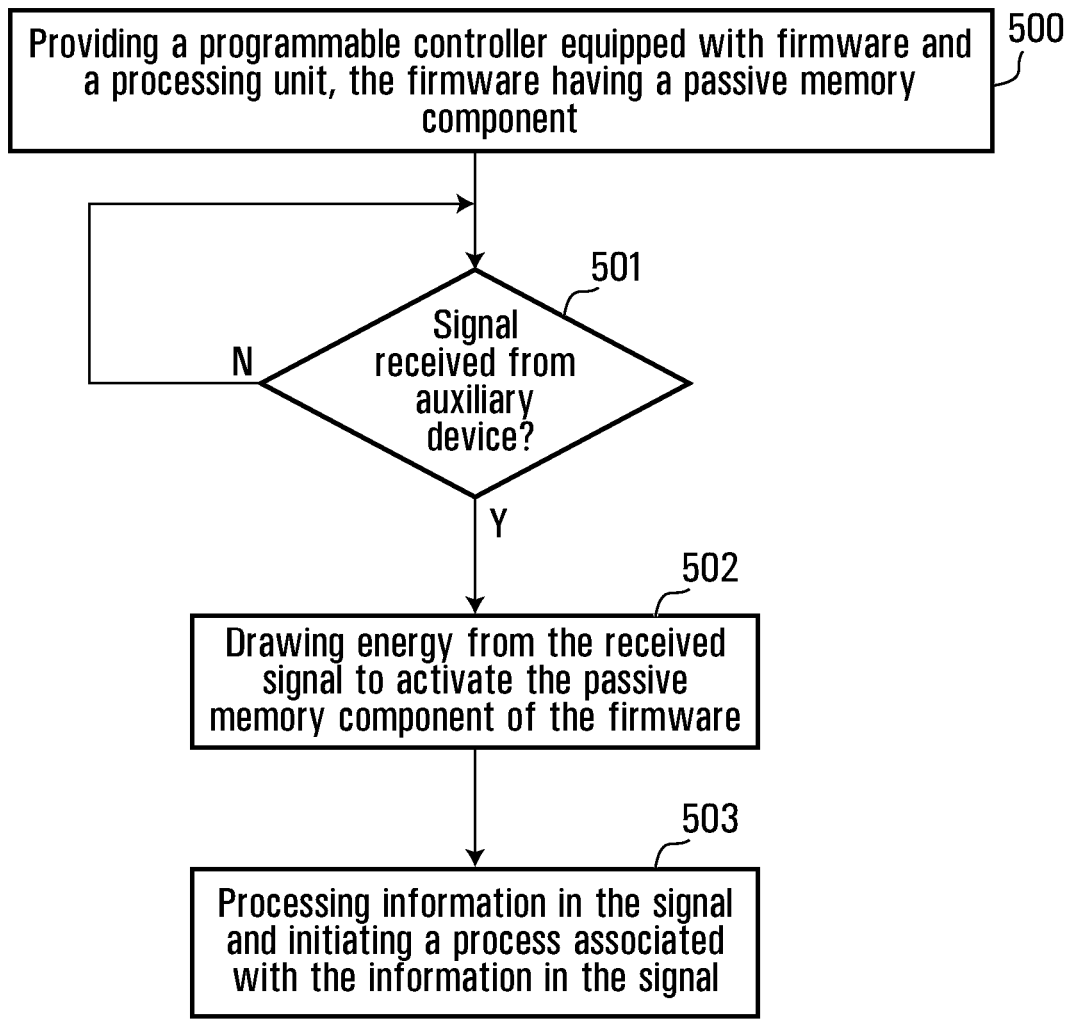

With reference to FIGS. 3 and 4, a specific process that may be implemented for configuring controller 120 using auxiliary device 150 for a specific variation/model of a device (or system) will now be described. FIG. 3 shows steps of this process associated with the auxiliary device 150 while FIG. 4 shows steps associated with the controller 120.

Starting with FIG. 3, at step 300, firmware update information associated with a specific variation/model of the device (or system) for which the controller 120 is being configured is obtained at the auxiliary device 150. The manner in which the firmware update information at step 300 may be obtained in practical implementations may vary from one implementation to the other and any suitable approach may be used. In the case where the auxiliary device 150 includes functionality allowing it to connect to a computer network, the firmware update information may for example be downloaded into the memory 200 of the auxiliary device 150 by using the auxiliary device 150 to access a remote server on which the firmware update information is stored. Alternatively, firmware update information may be stored on a computer readable medium, such as a flash drive, hard drive, memory stick, DVD and then loaded onto the memory 200 of auxiliary device 150 by establishing a suitable connection between the computer readable medium and the auxiliary device 150. The established connection may be performed either over a wire line link or wireless link using any suitable method.

Alternatively, or in addition to the above, obtaining firmware update information may include presenting a user of the auxiliary device 150 with a set of selectable options, wherein each option is associated with a specific available variation/model of the device for which the controller 120 can be configured as well as the associated firmware update information. Such selectable options may be presented to the user in a graphical user interface (GUI) displayed on a display device associated with the auxiliary device 150 (of the type shown for example in FIG. 2). Functionality may be provided on the auxiliary device 150 through the GUI for enabling the user to select a desired option using any suitable user operable input device, such as a keyboard, touch screen, voice input and the like. Once the firmware update information associated with the specific variation/model of the device (or system) for which the controller 120 is being configured has been obtained, the process proceeds to step 302.

At step 302, a signal carrying the firmware update information obtained at step 300 is generated and transmitted from the auxiliary device 150 to the controller 120 over wireless communication link 175. The transmittal by the auxiliary device 150 of the signal carrying the firmware update information may be triggered in any number of manners including, but not limited too, a command enter by a user through a user operable input control at the auxiliary device 150 (e.g. using a keyboard, touch sensitive screen, voice input and the like), by using a mechanism for detecting whether the auxiliary device 150 is in proximity to the controller 120 or by using any other suitable approach. In the non-limiting example depicted in FIG. 2, the transmittal by the auxiliary device 150 of the signal is triggered by actuating control 252 labeled "UPLOAD". The signal carrying the firmware update information is for causing the passive memory component 190 of the controller 120 to be activated by drawing energy from that signal and for causing a firmware update process to be performed by the controller 120 based on the update information carried by the signal while the passive memory component remains activated using energy drawn from the signal. As described elsewhere in the present document, the firmware update process may modify and/or replace program instructions and/or data stored on the passive memory component 190 based on the firmware update information carried by the signal.

In a specific implementation in which the auxiliary device 150 is equipped with an NFC (or RFID) transceiver and the controller 120 is equipped with an NFC (or RFID) memory, the NFC (or RFID) transceiver of the auxiliary device 150 is configured for transmitting to the controller 120 a signal carrying the firmware update information over wireless communication link 175. The signal carrying the firmware update information causes the NFC (or RFID) memory to be activated by drawing energy from the signal.

Optionally, a process for matching the auxiliary device 150 to the controller 120 may be performed at step 301 prior to the transmittal of the signal carrying the firmware update information at step 302. A purpose for such a matching process may be, for example, to ensure that the firmware update information that will be transmitted from the auxiliary device 150 is being installed on the correct controller (or correct type of controller). According to this optional feature, the passive memory component 190 of the controller 120 may store (amongst other) an identification code. In a non-limiting implementation, the identification code may convey the type of hardware platform associated with the controller 120. When the transceiver of the auxiliary device 150 comes into proximity of the passive memory component 190 of the controller, a "connection request signal" issued by the transceiver causes the passive memory component 190 to be activated by drawings energy from the "connection request signal" and to transmit the identification code stored on the passive memory component 190 to the auxiliary device 150. The identification code may be used by the auxiliary device 150 to recognize the controller 120 and confirm that it is acceptable to transmit the firmware update information to that controller. Optionally, an identification code identifying the auxiliary device 150 may also be transmitted as part of the "connection request signal". In such cases, the passive memory component 190 of the controller may then store the identification code identifying the auxiliary device 150. Once the controller 120 has been confirmed by auxiliary device 150, a signal carrying the firmware update information may be transmitted in the manner described earlier from the auxiliary device 150 to the controller 120 over the wireless communication link 175.

Optionally, (not shown in the figures) the auxiliary device 150 may be configured for transmitting to the controller 120 a signal carrying a device status request over wireless communication link 175 for causing the passive memory component 190 to perform a status report process. The status report process will be particularly useful in implementations in which an error log associated with the device operated by the controller 120 is maintained on the passive memory component 190. During the status report process, a reply signal conveying at least part of the data in the error log stored on the passive memory device is received by the auxiliary device 150 over the wireless communication link established between the passive memory component 190 and the auxiliary device 150.

Turning now FIG. 4, a flow diagram is depicted showing steps of a process for configuring controller 120 using auxiliary device 150 from the perspective of the controller 120.

At step 500, a programmable controller 120 of the type shown in FIG. 1 is provided. The programmable controller 120 is characterized by a hardware platform that can be configured to be used in connection with different variations/models of a device, where the variations/models may be perceptible for example in terms of the features provided by the device. In the case of the programmable controller 120 provided, configuring the programmable controller to the different variations/models of a device includes the installation of different associated software options. In this regards, the hardware platform of the programmable controller provided at step 500 is equipped with firmware 124 having a passive memory component 190 and a processing unit 122 programmed for operating the system at least in part in accordance with instructions stored on the firmware 124. The passive memory component 190 of the firmware 124 can be activated using power drawn from a signal transmitted from auxiliary device 150 over wireless communication link 175. In a specific implementation in which the auxiliary device 150 is equipped with an NFC (or RFID) transceiver, the passive memory component 190 may include an NFC (or RFID) memory, the NFC (or RFID) memory being configured for being activate by drawing energy from a signal originating from the auxiliary device 150.

Following step 500, the process proceeds to step 501.

At step 501, the programmable controller 120 may be an inactive state and may remain in that state until a signal originating from the auxiliary device 150 is received. In this inactive state, the programmable controller 120 need not be connected to an external source of electrical power. In specific practical implementations, the programmable controller 120 may have been packaged for shipping, in a box and/or other shipping container. When the programmable controller 120 is packaged prior to configuring the firmware 124, the box or container used for the shipping is configured to allow RF signals transmitted by the auxiliary device 150 positioned in proximity to the box or container to reach the passive memory component 190 of the firmware 124. For example, conventional cardboard boxes and plastic-based wrapping materials may be suitable for such packaging. Once a signal originating from the auxiliary device 150 is detected by the passive memory component 190, the process proceeds to step 502.

At step 502, the passive memory component 190 of the firmware 124 becomes activated by drawing energy from the signal originating from the auxiliary device 150.

The process then proceeds to step 503.

At step 503, while it remains activated using energy drawn from the signal originating from the auxiliary device 150, the passive memory component 190 processes the information carried by the signal originating from the auxiliary device 150. The information carried by the signal may cause different processes to be performed depending on the type of information carried by the signal.

For the purpose of illustration, the description will consider the following types of information that may be carried by the signal received from the auxiliary device: (a) firmware update information; (b) a connection request; and (c) a device status request.

In a first example in which the information carried by the signal includes firmware update information, the passive memory component 190 causes a firmware update process to be performed. The firmware update process includes modifying instructions and/or data stored in the passive memory component 190 based on the update information carried by the signal. At least part of the firmware update process is performed while the passive memory component remains activated using energy drawn from the signal originating from the auxiliary device 150.

In a second example in which the information carried by the signal includes a connection request, the passive memory component 190 may cause a component matching process to be performed. In a specific embodiment supporting the component matching process, the passive memory component 190 of the controller may store (amongst other) an identification code. In a non-limiting implementation, the identification code may convey the type of hardware platform associated with the controller 120. The component matching process includes causing the passive memory component 190 to transmit the identification code to the auxiliary device 150. The identification code may be used by the auxiliary device 150 to recognize the controller 120 and determine whether specific firmware update information is suitable for that controller. Optionally, a code may also be transmitted as part of the "connection request signal" from the auxiliary device 150. In such cases, the passive memory component 190 may store the code received from the auxiliary device 150 as part of the component matching process. The code transmitted from the auxiliary device 150 may include a component identifying the auxiliary device 150 and, optionally may include a key based on which the passive memory component 190 may determine whether to accept further information, including firmware update information, from the auxiliary device 150. In a non-limiting implementation, the successful completion of a component matching process between the controller 120 and a specific auxiliary device 150 may be required prior to the controller 120 accepting firmware update information from that auxiliary device 150. In such non limiting implementations, only once the component matching process has been completed can the controller 120 and the auxiliary device 150 communicate with one another. The component matching process of the type described above may be performed while the passive memory component 190 remains activated using energy drawn from the signal originating from the auxiliary device 150. It is to be appreciated that the component matching process may be omitted from certain implementations and is considered to be an optional process in the context of the present invention.

In a third example in which the information carried by the signal includes a device status request, the passive memory component 190 causes a status report process to be performed. The status report process will be particularly useful in implementations in which an error log associated with the device operated by the controller is maintained on the passive memory component 190. During the status report process, a reply signal is sent by the passive memory component 190 in response to the device status request signal. The reply signal conveys at least part of the data in the error log stored on the passive memory device is transmitted to the auxiliary device 150 over the wireless communication link established between the passive memory component 190 and the auxiliary device 150. The transmittal of the reply signal to the auxiliary device 150 is performed while the passive memory 190 component remains activated using energy drawn from the signal carrying the device status request.

It is to be understood that the signals originating from the auxiliary device 150 may carry information elements of the type suggested above alone or in combination (for example a combination of a connection request signal+firmware update information). It is also to be appreciated that practical implementations need not support all the above described types of information. For example certain non-limiting implementations may support signals carrying firmware update information and may not support signals carrying a device status request and/or a connection request, for example. In addition, it is also to be understood that the signal originating from the auxiliary device 150 may carry other types of information and that the specific examples presented here are been provided for the purpose of illustration only.

Practical Examples

Using the concepts described above, a controller manufacturer can manufacture a controller, of the type described with reference to the controller 120, having a hardware platform that can be used to control different variations/models of a device. Depending on the desired use of the controller 120, the firmware 124 can be configured for a specific variation/model of the device using a suitable auxiliary device 150 without having to activate the controller 120 using an external source of electrical power by using processes and tools of the type described in the present document.

The programmable controllers of the type described in this document present advantages over some conventional controllers by allowing the firmware of the controllers to be configured and/or updated without having to connect the controllers to an external source of electrical power. This may allow for example, a manufacturer to build the hardware platform of the programmable controllers and prepackage them before finalizing the configuration of the firmware in order to have an inventory of ready to ship controllers that only require the firmware to be updated/configured. As a result, the delay between the receipt of an order and the time to shipment may be significantly reduced since the controllers need not be activated for such update/configuration to be performed and since the controllers are already in ready-to-ship packages.

Figure 5A:
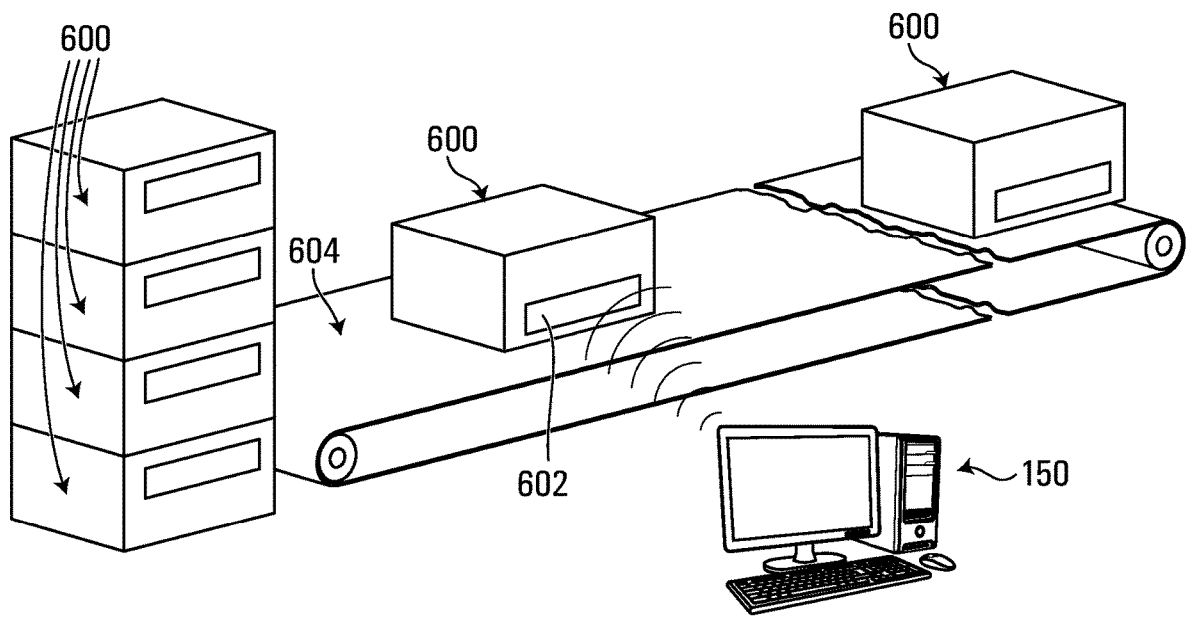
FIG. 5A shows a conceptual block diagram of a portion of an assembly line used for configuring programmable controllers in accordance with a first non-limiting example of implementation of the present invention.
Figure 5B:
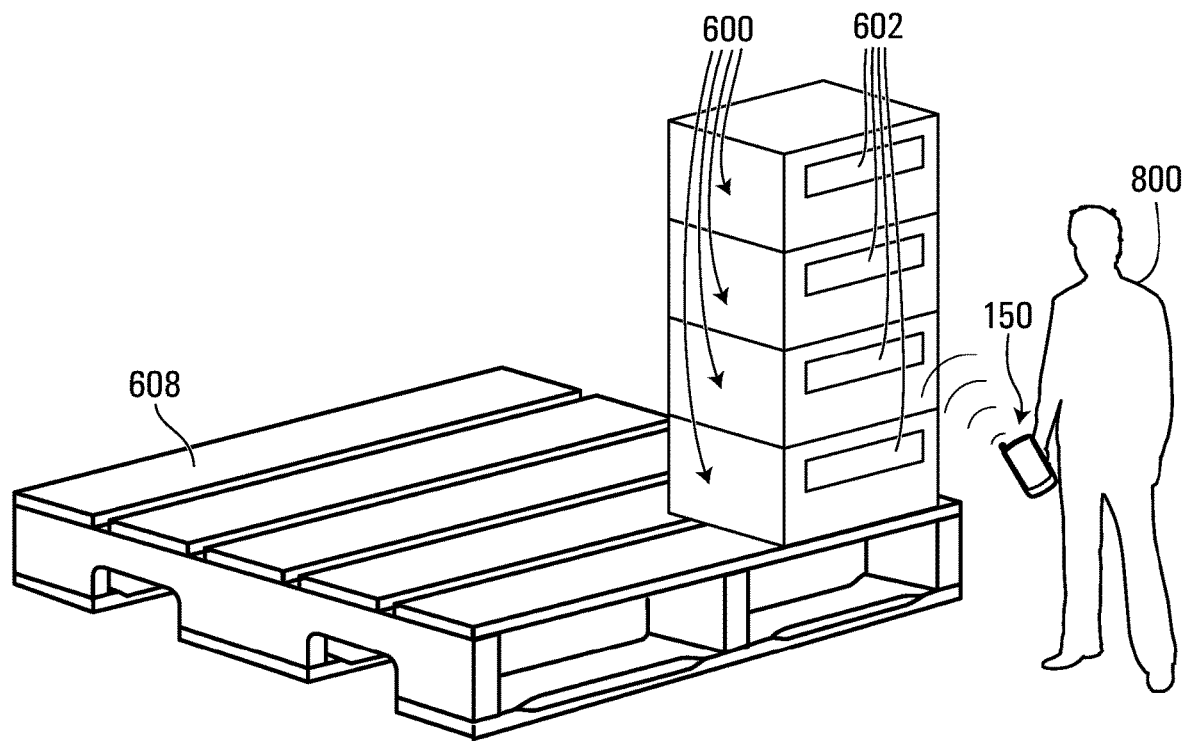
FIG. 5B shows a plurality of programmable controllers packaged in boxes and stacked for storage and/or shipment and an auxiliary device for configuring the packaged programmable controllers in accordance with a second non-limiting example of implementation of the present invention.

FIGS. 5A and 5B shows examples in which hardware platforms for programmable controllers of the type described in the present document have been built by a manufacturer and packaged for shipment. While this cannot be seen in FIGS. 5A and 5B, it is to be understood that shipping boxes 600 hold controllers of the type described in the present document. Once the manufacturer knows what variations/models of a device the controllers are to be configured for, the manufacturer makes use of an auxiliary device 150 in order to program the firmware of the controllers. More specifically, the auxiliary device 150 is brought into proximity with each one of the shipping boxes 600 that holds a controller that is to be configured so that the passive memory components 124 of the firmware is activated by a signal transmitted from the auxiliary device 150 in order to perform a firmware update process in accordance with the process described earlier on in the present document. Optionally, the shipping boxes 600 provide respective indicators 602 to identify the area of the shipping boxes 600 that is most suitable to be brought into proximity with the auxiliary device 150 in order to facilitate the communication between the passive memory component of the controller in the box and the auxiliary device 150.

FIG. 5A shows a first example in which individual shipping boxes 600 holding controllers are placed on a conveyor belt 604 which causes each shipping box to pass by an auxiliary device 150 that is in the form of a dedicated programming station. As a shipping box 600 is carried by the conveyor belt in proximity to the auxiliary device 150, a signal carrying firmware update information is transmitted from the auxiliary device 150 to the specific controller in the shipping box 600 thereby causing a firmware update process to be performed to update the instructions of the firmware of that specific controller. The firmware update process is performed based on the update information carried by the signal in accordance with the processes described earlier in the present document.

FIG. 5B shows a second example in which shipping boxes 600 holding controllers are stacked on a shipping pallet 608 and in which an auxiliary device in the form of a portable auxiliary device 150, such as a smartphone for example, is used for configuring the firmware of the controllers held in the boxes. In this example, the auxiliary device 150 is brought into proximity with each of the individual shipping boxes 600 by a human operator 200 or by a mechanical device such as a robotic arm for example (not shown in the figures). As the auxiliary device 150 is brought into proximity with a shipping box 600, a signal carrying firmware update information is transmitted from the auxiliary device 150 to the specific controller in the shipping box 600 thereby causing a firmware update process to be performed to update the instructions of the firmware of that specific controller. The firmware update process is performed based on the update information carried by the signal in a manner of the type described earlier in the present document. Alternatively, the controllers and/or the auxiliary device may be equipped with components having emission and reception capabilities with a broader range so that data can be received/transmitted without the auxiliary device needing to be displaced for each individual shipping box.

FIGS. 5A and 5B are only specific practical examples showing two manners in which a manufacturer may use the concepts presented in the present document in order to facilitate the configuration of controllers having hardware platforms that can be used to control different variations/models of a device. It is to be appreciated that many other manners will become apparent to the person skilled in the art in light of the present description.

Alternatively, rather than (or in addition to) being performed by the controller manufacturer, the configuring of the firmware 124 may be performed by an original equipment manufacturer (OEM) and/or by a distributor making use of controllers. In such a case, the manufacturer of such controllers may supply the OEM or the distributor with a number of controllers such that can be used to control different variations/models of a device, which the firmware of the controllers has not yet been configured (or alternatively the firmware has been configured in a default manner). In order to enable the OEM or distributor to customize a specific controller for a specific variation/model of the device, the manufacturer may make available computer code executable by an auxiliary device of the type described with reference to auxiliary device 150 either by making this code accessible over a computer network or by providing a non-transitory computer readable memory storing such computer code to the OEM or the distributor.

Programmable controllers of the type presented in the present document can also alternatively be updated/configured by an end user of the device in a convenient and straight forward manner without having to activate the controller using a suitably programmed auxiliary device.

Although the present invention has been described in considerable detail with reference to certain preferred embodiments thereof, variations and refinements are possible. Therefore, the scope of the invention should be limited only by the appended claims and their equivalents.

The invention claimed is:

1. An industrial appliance comprising:
   a. one or more electrically powered components forming part of the industrial appliance;
   b. a housing holding a programmable controller for operating the one or more electrically powered components, said programmable controller comprising:
      i. a memory module having stored thereon firmware including instructions for controlling operations of the one or more electrically powered components, said memory module including a memory component on which at least a portion of the instructions are stored, the memory component of the memory module being configured to be responsive to a signal carrying update information received over a wireless communication link from a device external to the industrial appliance for causing a firmware update process to be performed to modify the instructions based on the update information carried by the signal, wherein at least in part of the firmware update process is performed in the absence of electrical power being supplied to the programmable controller from a source external to the industrial appliance other than the signal carrying the update information;

ii. a processing unit in communication with said memory module, said processing unit being programmed for operating the one or more electrically powered components at least in part in accordance with the instructions stored in the memory module.

2. The industrial appliance as defined in claim 1, wherein at least part of the firmware update process is performed while the memory component remains activated using energy drawn from said signal as its sole source of electrical energy.

3. The industrial appliance as defined in claim 1, wherein the update information includes program code implementing a set of configurations, said set of configurations includes at least a first configuration and a second configuration.

4. The industrial appliance as defined in claim 1, wherein the update information conveys an access code and:
   a. wherein the instructions stored on said memory module implement a set of configurations including at least a first configuration and a second configuration, the access code being associated with a specific one of the first configuration and the second configuration; and
   b. wherein the processing unit is programmed for operating the industrial appliance in accordance with the specific one of the first configuration and the second configuration associated with the access code.

5. The industrial appliance as defined in claim 4, wherein the processing unit is programmed for selecting the specific one of the first configuration and the second configuration at least in part by processing the access code to select a portion of the instructions stored on the memory module, where the selected portion of the instruction implements the specific one of the first configuration and the second configuration.

6. The industrial appliance as defined in claim 4, wherein said programmable controller is configured for:
   a. operating a first set of electrically powered components of the industrial appliance when operating the industrial appliance in accordance with the first configuration; and
   b. operating a second set of electrically powered components when operating the industrial appliance in accordance with the second configuration.

7. The industrial appliance as defined in claim 6, wherein said second set of electrically powered components includes at least one component absent from said first set of electrically powered components.

8. The industrial appliance as defined in claim 1, wherein:
   a. said instructions for controlling operations of the industrial appliance include program code implementing a set of configurations including at least a first configuration and a second configuration, and wherein the memory module stores said program code; and
   b. wherein the update information carried by the signal received from the device external to the industrial appliance is associated with a specific one of the first configuration and the second configuration.

9. The industrial appliance as defined in claim 8, wherein:
   a. the firmware update process includes storing the update information carried by the signal on the memory component of the memory module; and
   b. wherein the processing unit of the programmable controller is programmed for:
      i. selecting a specific configuration from the set of configurations implemented by the program code stored in the memory module at least in part by processing the update information stored on the memory component of the memory module; and
      ii. operating the one of more electrically powered components of the industrial appliance in accordance with the selected specific configuration implemented by the program code stored in the memory module of the programmable controller.

10. The industrial appliance as defined in claim 1, wherein the memory component is configured for communicating with the device external to the industrial appliance over a radio frequency (RF) communication link established between the memory component and the device external to the industrial appliance.

11. The industrial appliance as defined in claim 1, wherein the memory component includes a near field communication memory (NFC memory).

12. The industrial appliance as defined in claim 1, wherein the industrial appliance is one of an industrial stove, blender, bathing unit system, pump, motor and restaurant appliance.

13. An auxiliary device programmed for configuring an industrial appliance having one or more electrically powered components and a programmable controller, the programmable controller comprising a memory module having stored thereon firmware including instructions for controlling operations of the one or more electrically powered components of the industrial appliance, said memory module including a memory component on which at least a portion of the instructions are stored, the programmable controller being programmed for operating the electrically powered components of the industrial appliance at least in part in accordance with the instructions stored on the memory module, said auxiliary device comprising:
   a. a communication interface suitable for communicating with the programmable controller of the industrial appliance over a wireless communication link;
   b. a processing unit in communication with the communication interface programmed for transmitting a signal over the wireless communication link to the programmable controller carrying update information associated with the industrial appliance, the signal being configured for causing a firmware update process to be performed by the programmable controller to modify the instructions based on the update information carried by the signal, at least part of said firmware update process being performed by the programmable controller while the memory component remains activated at least in part using energy drawn from said signal as a source of electrical energy and in the absence of electrical energy being supplied by a source external to the industrial appliance other than the signal carrying the update information.

14. The auxiliary device as defined in claim 13, wherein the wireless communication link is a radio frequency (RF) communication link and wherein the signal carrying the update information associated with the industrial appliance is an RF signal.

15. The auxiliary device as defined in claim 13, wherein the auxiliary device is embodied in a near field communication (NFC) enabled computing device and wherein the memory component of the programmable controller includes an NFC memory.

16. The auxiliary device as defined in claim 15, wherein the NFC enabled computing device is a smartphone.

17. A method for configuring an industrial appliance having one or more electrically powered components and a programmable controller, the programmable controller comprising a memory module having stored thereon firmware including instructions for controlling operations of the one or more electrically powered components of the industrial appliance, said memory module including a memory component on which at least a portion of the instructions are stored, the programmable controller being programmed for operating the electrically powered component of the industrial appliance at least in part in accordance with the instructions stored in the memory module, said method comprising:
  a. using a portable auxiliary device, obtaining update information associated with the industrial appliance;
  b. using the auxiliary device, transmitting a signal carrying the update information associated with the industrial appliance to the programmable controller over a wireless communication link, the signal being configured for causing a firmware update process to be performed by the programmable controller of the industrial appliance to update the instructions based on the update information carried by the signal, at least part of said firmware update process being performed by the programmable controller while the memory component remains activated at least in part using energy drawn from said signal as a source of electrical energy and in the absence of electrical energy being supplied by a source external to the industrial appliance other than the signal carrying the update information.

18. The method as defined in claim 17, wherein the wireless communication link is a radio frequency (RF) communication link and wherein the signal carrying the update information associated with the industrial appliance is an RF signal.

19. The method as defined in claim 17, wherein the portable auxiliary device is embodied in a near field communication (NFC) enabled computing device and wherein the memory component of the programmable controller includes an NFC memory.

20. The method as defined in claim 19, wherein the NFC enabled device is a smartphone.

\* \* \* \* \*